US010392953B2

United States Patent
Miller et al.

(10) Patent No.: US 10,392,953 B2
(45) Date of Patent: Aug. 27, 2019

(54) RING SEAL ARRANGEMENT

(71) Applicant: United Technologies Corporation, Farmington, CT (US)

(72) Inventors: Jonathan Logan Miller, Ware, MA (US); Colin D. Craig, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/623,835

(22) Filed: Jun. 15, 2017

(65) Prior Publication Data

US 2018/0363484 A1 Dec. 20, 2018

(51) Int. Cl.
| | | |
|---|---|---|
| *F01D 11/00* | (2006.01) | |
| *F16J 15/16* | (2006.01) | |
| *F16J 15/44* | (2006.01) | |
| *F01D 25/16* | (2006.01) | |

(52) U.S. Cl.
CPC .......... *F01D 11/003* (2013.01); *F01D 25/162* (2013.01); *F16J 15/16* (2013.01); *F16J 15/441* (2013.01); *F05D 2220/32* (2013.01); *F05D 2240/60* (2013.01)

(58) Field of Classification Search
CPC ........ F01D 11/003; F01D 25/16; F01D 25/18; F16J 15/34; F16J 15/3436; F16J 15/3452; F05D 2220/32; F05D 2240/60; F05D 2260/52
See application file for complete search history.

(56) References Cited

U.S. PATENT DOCUMENTS

| | | | | |
|---|---|---|---|---|
| 4,211,424 A | * | 7/1980 | Stein ..................... | F01D 11/003 277/352 |
| 4,408,765 A | * | 10/1983 | Adelmann, Jr. ......... | F16J 15/38 277/388 |
| 5,217,232 A | * | 6/1993 | Makhobey ............. | F16J 15/164 277/411 |
| 6,692,006 B2 | * | 2/2004 | Holder ................... | F16J 15/442 277/346 |
| 8,967,627 B2 | | 3/2015 | Jahn et al. | |
| 9,982,553 B2 | | 5/2018 | Miller | |
| 2012/0043725 A1 | * | 2/2012 | Jahn ........................ | F01D 11/00 277/306 |

(Continued)

FOREIGN PATENT DOCUMENTS

JP H01206165 A 8/1989

OTHER PUBLICATIONS

U.S. Appl. No. 15/481,164 titled "Ring Seal Arrangement" filed Apr. 6, 2017.

(Continued)

*Primary Examiner* — Gilbert Y Lee
(74) *Attorney, Agent, or Firm* — Carlson, Gaskey & Olds, P.C.

(57) ABSTRACT

A ring seal assembly includes a first ring seal that is symmetrical with respect to a radially extending plane. A second ring seal is separated axially from the first ring seal by a spring. The second ring seal includes a first inner circumferential surface. An interference feature extends radially inward from the first inner circumferential surface to a second inner circumferential surface.

20 Claims, 6 Drawing Sheets

(56) References Cited

U.S. PATENT DOCUMENTS

| | | | |
|---|---|---|---|
| 2014/0049009 A1* | 2/2014 | Jahn | F16J 15/30 277/510 |
| 2016/0208710 A1 | 7/2016 | Miller et al. | |
| 2016/0208923 A1 | 7/2016 | Miller | |
| 2016/0273375 A1 | 9/2016 | Miller | |
| 2017/0362949 A1* | 12/2017 | Von Berg | F01D 11/003 |

OTHER PUBLICATIONS

European Search Report for European Application No. 18178118.8 dated Nov. 15, 2018.

* cited by examiner

RING SEAL ARRANGEMENT

BACKGROUND

The present disclosure relates generally to gas turbine engines, and more specifically, to ring seal arrangements for gas turbine engines.

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

SUMMARY

In one exemplary embodiment, a ring seal assembly includes a first ring seal that is symmetrical with respect to a radially extending plane. A second ring seal is separated axially from the first ring seal by a spring. The second ring seal includes a first inner circumferential surface. An interference feature extends radially inward from the first inner circumferential surface to a second inner circumferential surface.

In a further embodiment of any of the above, the first ring seal has an inner diameter. The first inner circumferential surface is radially aligned with the inner diameter.

In a further embodiment of any of the above, the second ring seal includes axially outer surfaces spaced laterally from one another. The interference feature is provided by a flange proximate to one of the axially outer surfaces.

In a further embodiment of any of the above, the flange is annular.

In a further embodiment of any of the above, one of the axially outer surfaces includes an axial surface groove.

In a further embodiment of any of the above, the flange includes first and second faces laterally spaced from one another. The first lateral face is adjacent to the first inner circumferential surface. The second inner circumferential surface interconnects the first and second lateral faces.

In a further embodiment of any of the above, the second lateral face is flush with the one of the axially outer surfaces.

In a further embodiment of any of the above, an axial surface groove extends across the second lateral face to the second inner circumferential surface.

In a further embodiment of any of the above, the second lateral face is axially recessed with respect to the one of the axially outer surfaces.

In a further embodiment of any of the above, the second ring seal includes an extended leg protruding in an axial direction from the other of the axially outer surfaces towards the first ring seal. The extended leg and the other of the axially outer surfaces define a spring cavity on an inner radial side of extended leg that receives the spring. The extended leg and the other of the axially outer surfaces define a clearance cavity on an outer radial side of the extended leg.

In another exemplary embodiment, a gas turbine engine includes an engine static structure. A shaft is supported for rotation by the engine static structure. First and second compartments are axially spaced apart from one another and provided between the engine static structure and the shaft. A ring seal assembly separates the first and second compartments. The ring seal assembly includes a first ring seal and a second ring seal separated axially from the first ring seal by a spring. The second ring seal includes a first inner circumferential surface. An interference feature extends radially inward from the first inner circumferential surface to a second inner circumferential surface.

In a further embodiment of any of the above, first and second seats are mounted to the shaft. The ring seal assembly is axially arranged between the first and second seats. The first and second ring seals respectively engage the first and second seats.

In a further embodiment of any of the above, the first compartment is an air compartment and the second compartment is a bearing compartment. The first ring seal is symmetrical with respect to a radially extending plane.

In a further embodiment of any of the above, the first ring seal has an inner diameter. The first inner circumferential surface is radially aligned with the inner diameter. The second ring seal includes axially outer surfaces spaced laterally from one another. The interference feature is provided by an annular flange proximate to one of the axially outer surfaces.

In a further embodiment of any of the above, one of the axially outer surfaces includes an axial surface groove.

In a further embodiment of any of the above, the flange includes first and second faces laterally spaced from one another. The first lateral face is adjacent to the first inner circumferential surface. The second inner circumferential surface interconnects the first and second lateral faces.

In a further embodiment of any of the above, the second lateral face is flush with the one of the axially outer surfaces.

In a further embodiment of any of the above, the axial surface groove extends across the second lateral face to the second inner circumferential surface.

In a further embodiment of any of the above, the second lateral face is axially recessed with respect to the one of the axially outer surfaces.

In a further embodiment of any of the above, the second ring seal includes an extended leg protruding in an axial direction from the other of the axially outer surfaces towards the first ring seal. The extended leg and the other of the axially outer surfaces define a spring cavity on an inner radial side of extended leg that receives the spring. The extended leg and the other of the axially outer surfaces define a clearance cavity on an outer radial side of the extended leg.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
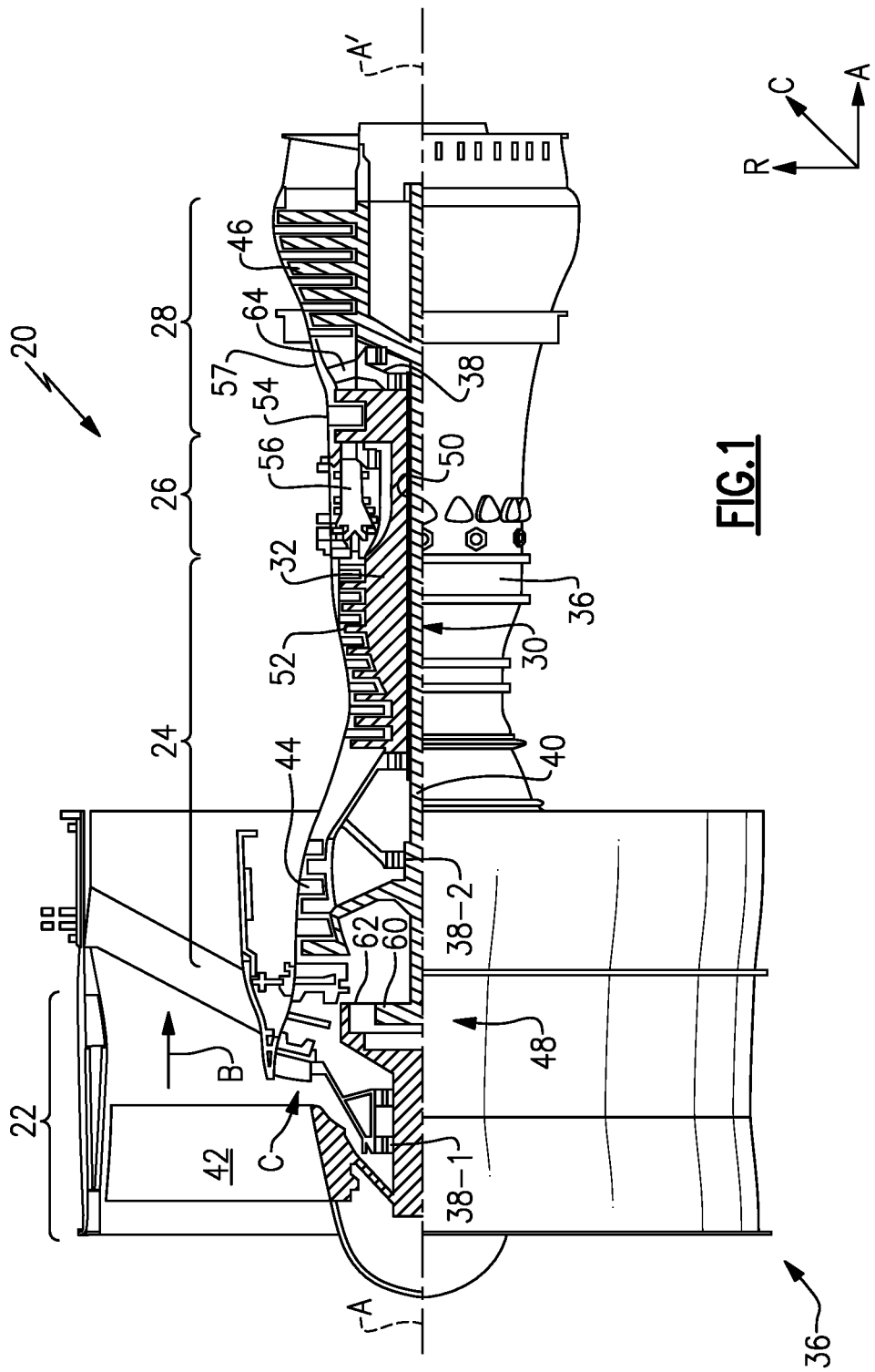
FIG. 1 illustrates an exemplary gas turbine engine, in accordance with various embodiments.

In various embodiments, and with reference to FIG. 1, a gas turbine engine 20 is disclosed. As used herein, "aft" refers to the direction associated with a tail (e.g., the back end) of an aircraft, or generally, to the direction of exhaust of gas turbine engine 20. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive coolant (e.g., air) along a bypass flow-path B, while compressor section 24 may further drive coolant along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the coolant along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 64 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
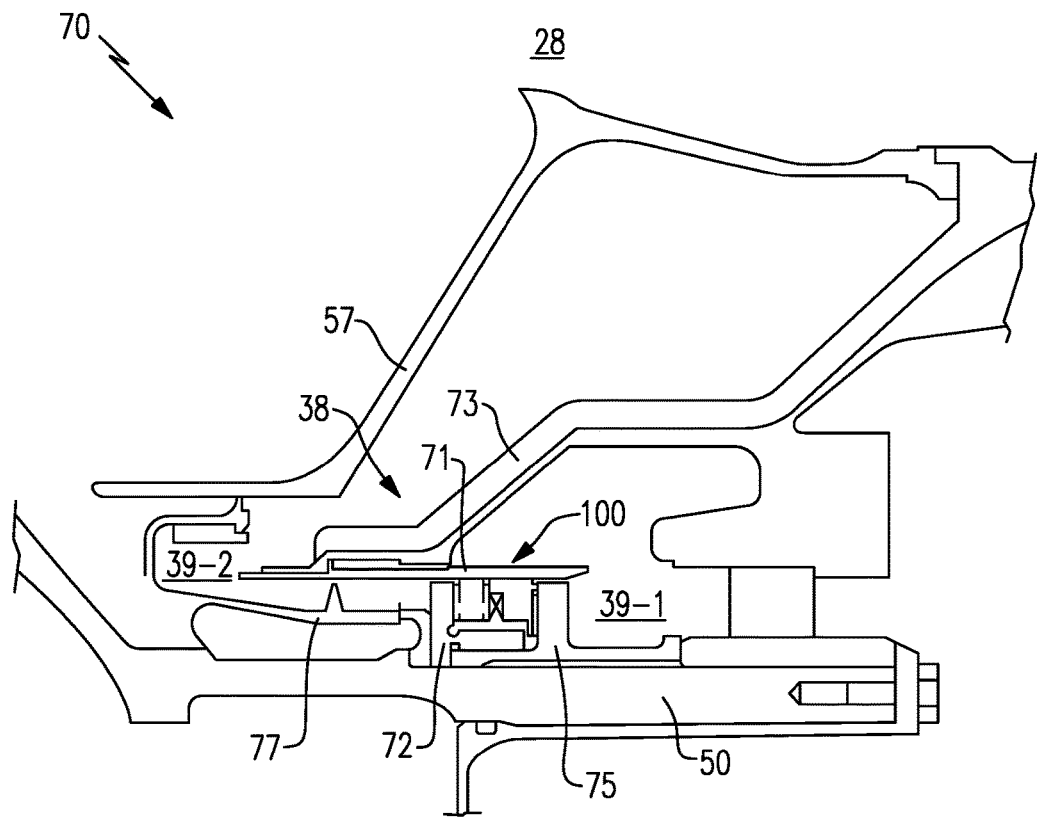
FIG. 2 illustrates a cross-sectional view of an engine section of an exemplary gas turbine engine having a ring seal arrangement, in accordance with various embodiments.

With reference now to FIG. 2 and continued reference to FIG. 1, a portion of an engine section 70 is depicted, in accordance with various embodiments. Although engine section 70 is illustrated in FIG. 2, for example, as a part of turbine section (e.g., turbine section 28), it will be understood that the seal arrangements in the present disclosure are not limited to the turbine section, and could extend to other sections of gas turbine engine 20 and to other bearing assemblies (e.g., bearing system 38, bearing system 38-1, and/or bearing system 38-2). Moreover, the present disclosure may extend to any other rotating mechanical equipment, and/or the like, wherein a high pressure fluid compartment is sealed from a low pressure fluid compartment. In various embodiments, engine section 70 may include mid-turbine frame 57 of gas turbine engine 20. Mid-turbine frame 57 may be located aft of high pressure turbine 54 and forward of low pressure turbine 46 and may be mechanically coupled to bearing system 38. Bearing system 38 may be mechanically coupled to outer shaft 50 and may supply lubrication to rotating components. Bearing system 38 may comprise a high pressure compartment 39-2 and/or a bearing compartment 39-1. High pressure compartment 39-2 may be defined by a support case 73, a static liner 71, high pressure compartment rotating structure 77, and/or a front seat 72. High pressure compartment 39-2 may comprise a high pressure fluid (e.g., air from turbine section 28). Bearing compartment 39-1 may be defined by support case 73, static liner 71, a rear seat 75, and/or outer shaft 50. Bearing compartment 39-1 may be configured to comprise a low pressure fluid (e.g., oil to lubricate rotating components). Front seat 72 may be coupled to rear seat 75 to allow bearing compartment 39-1 and high pressure compartment 39-2 to be in fluid communication via a ring seal arrangement 100. Front seat 72 and rear seat 75 may be coupled to outer shaft 50. Ring seal arrangement 100 may be configured to at least partially seal the high pressure fluid from high pressure compartment 39-2 from leaking into bearing compartment 39-1, and to at least partially seal the low pressure fluid from bearing compartment 39-1 from leaking into high pressure compartment 39-2.

Figure 3:
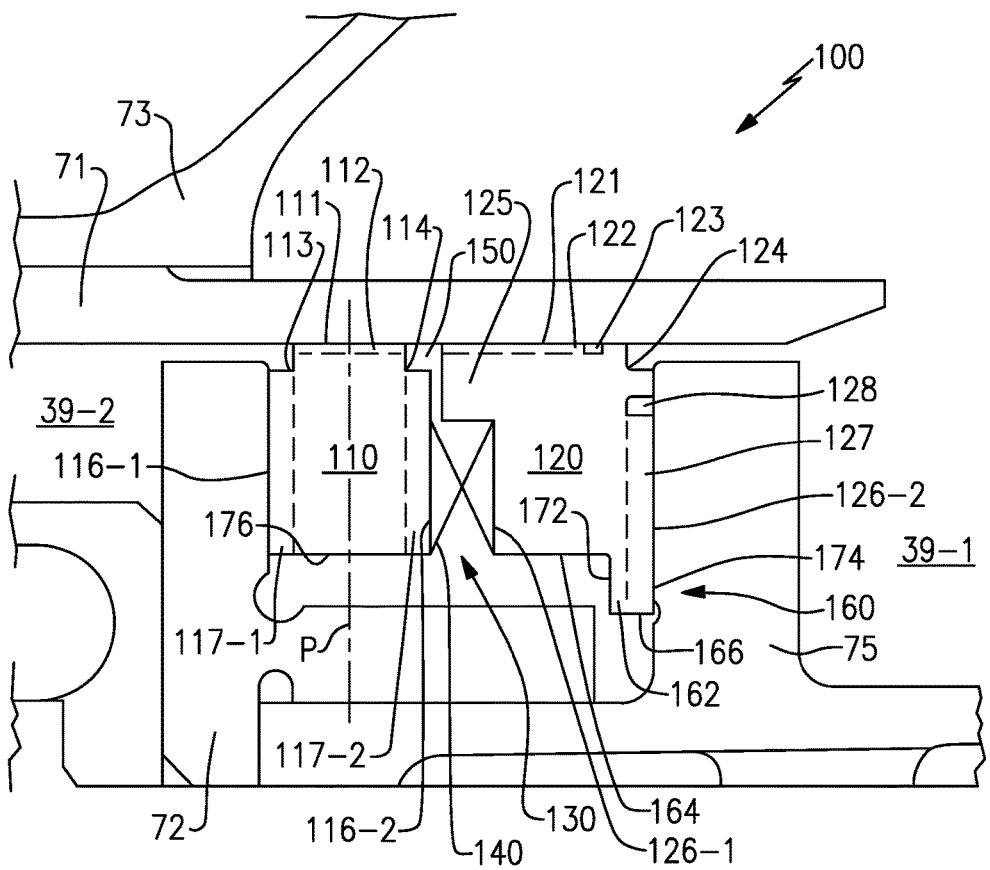
FIG. 3 illustrates a cross-sectional view of a ring seal arrangement, in accordance with various embodiments.

In various embodiments, and with reference to FIG. 3, ring seal arrangement 100 is depicted in greater detail. Ring seal arrangement 100 may comprise an air side ring seal 110 (e.g., a first ring seal or a forward ring seal) and an oil ring seal 120 (e.g., a second ring seal or an aft ring seal). Ring seal arrangement 100 may be configured to reduce the high pressure fluid from high pressure compartment 39-2 entering into bearing compartment 39-1, and/or reduce the low pressure fluid from bearing compartment 39-1 entering into high pressure compartment 39-2. Air side ring seal 110 may be located adjacent front seat 72 and static liner 71. Oil side ring seal 120 may be located adjacent rear seat 75 and static liner 71. In that respect, air side ring seal 110 may be configured to at least partially minimize the high pressure fluid from high pressure compartment 39-2 leaking into bearing compartment 39-1, and oil side ring seal 120 may be configured to at least partially minimize the low pressure fluid from bearing compartment 39-1 leaking into high pressure compartment 39-2.

Ring seal arrangement 100 may be configured to at least partially reduce a pressure differential across air side ring seal 110 and/or at least partially reduce the resulting axial force pushing air side ring seal 110 axially away from front seat 72. By at least partially reducing the pressure differential across air side ring seal 110, ring seal arrangement 100 may also at least partially reduce a spring force sufficient for the spring 140 (and/or similar components) to ensure positive seating and/or sealing for air side ring seal 110 and oil side ring seal 120 within ring seal arrangement 100. For example, and in various embodiments, ring seal arrangement 100 may be configured to provide zero pressure differential across air side ring seal 110, thus reducing the spring force sufficient to ensure positive seating and/or sealing for air side ring seal 110 and oil side ring seal 120 within ring seal arrangement 100. In that respect, ring seal arrangement 100 may increase durability, wear resistance, performance, and/or reliability in air side ring seal 110 and oil side ring seal 120. Ring seal arrangement 100 may also delay and/or at least partially prevent seal failure in ring seal arrangement 100 during engine operation.

In various embodiments, air side ring seal 110 and oil side ring seal 120 may each comprise an annular shape. Air side ring seal 110 and/or oil side ring seal 120 may comprise a single continuous circumferential ring forming each respective annular shape. In various embodiments, air side ring seal 110 and/or oil side ring seal 120 may also comprise one or more segments coupled together end to end to form each respective annular shape. Air side ring seal 110 and/or oil side ring seal 120 may comprise suitable circumferential ring seal, and may also comprise any suitable material capable of providing sealing between two pressurized compartments, such as, for example, carbon, rubber, carbon graphite, and/or the like.

Figure 4A:
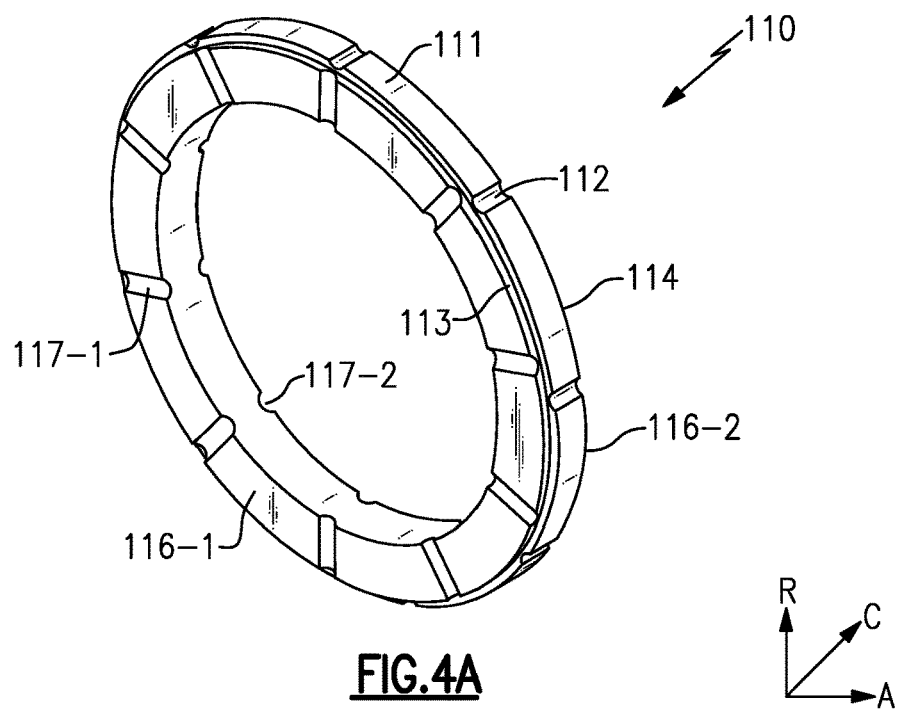
FIG. 4A illustrates a perspective view of an air side ring seal for a ring seal arrangement, in accordance with various embodiments.

In various embodiments, and with reference to FIGS. 3 and 4A, air side ring seal 110 may comprise a first radially outer surface 111 configured to contact static liner 71 to at least partially provide sealing against static liner 71. Air side ring seal 110 may also comprise a first forward axially outer surface 116-1 opposite a first aft axially outer surface 116-2. First forward axially outer surface 116-1 may be configured to contact front seat 72 and at least partially providing sealing against front seat 72. First aft axially outer surface 116-2 may be configured to interface with a second forward axially outer surface 126-1 of oil side ring seal 120, as discussed further herein.

In various embodiments, air side ring seal 110 may comprise various bleed grooves and/or slots configured to relieve and/or balance pressure from high pressure compartment 39 against air side ring seal 110 (e.g., by allowing high pressure fluid or air to leak into each bleed groove or slot). For example, air side ring seal 110 may comprise one or more first radial surface grooves 112. In that regard, air side ring seal 110 may comprise any suitable and/or desired number of first radial surface grooves 112. Each first radial surface groove 112 may define a groove along the axial axis A on first radially outer surface 111. First radial surface grooves 112 may be dispersed circumferentially around first radially outer surface 111 at any suitable distance. As a further example, and in various embodiments, air side ring seal 110 may also comprise one or more first forward axial surface grooves 117-1 and/or one or more first aft axial surface grooves 117-2. In that regard, air side ring seal 110 may comprise any suitable and/or desired number of first forward axial surface grooves 117-1 and/or first aft axial surface grooves 117-2. Each first forward axial surface grooves 117-1 may define a groove along the radial axis R on first forward axially outer surface 116-1. First forward axial surface grooves 117-1 may be dispersed circumferentially around first forward axially outer surface 116-1 at any suitable distance. Each first aft axial surface grooves 117-2 may define a groove along the radial axis R on first aft axially outer surface 116-2. First aft axial surface grooves 117-2 may be dispersed circumferentially around first aft axially outer surface 116-2 at any suitable distance. In various embodiments, first forward axial surface grooves 117-1 and/or first aft axial surface grooves 117-2 may be aligned with first radial surface groove 112. In various embodiments, first forward axial surface grooves 117-1 and/or first aft axial surface grooves 117-2 may be misaligned (e.g., offset) with first radial surface groove 112.

In various embodiments, air side ring seal 110 may comprise a first forward notch 113. First forward notch 113 may define a circumferential groove along first radially outer surface 111 and first forward axially outer surface 116-1 of air side ring seal 110. First forward notch 113 may be configured to allow for uniform wear on air side ring seal 110 during engine operation. In various embodiments, air side ring seal 110 may also comprise a first aft notch 114. First aft notch 114 may define a circumferential groove along first radially outer surface 111 and first aft axially outer surface 116-2 of air side ring seal 110. First aft notch 114 may be similar to first forward notch 113 and may comprise similar physical dimensions. First aft notch 114 may enable air side ring seal 110 to be symmetrically shaped. A symmetrical shape may aide in installation of air side ring seal 110. First aft notch 114 may also be configured to at least partially aid in allowing for uniform wear on air side ring seal 110 during engine operation.

Figure 4B:
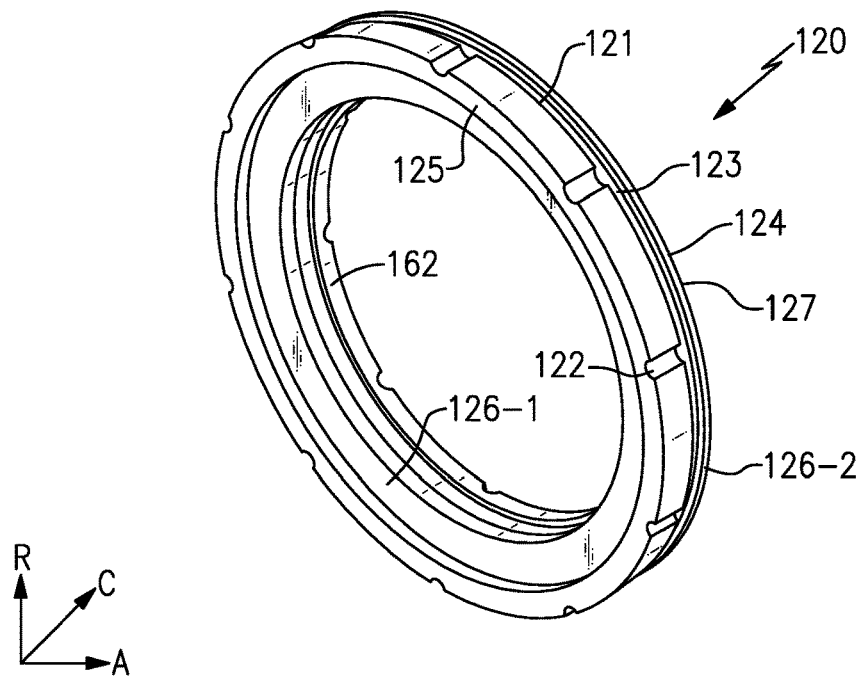
FIG. 4B illustrates a forward perspective view of an oil side ring seal for a ring seal arrangement, in accordance with various embodiments.
Figure 4C:
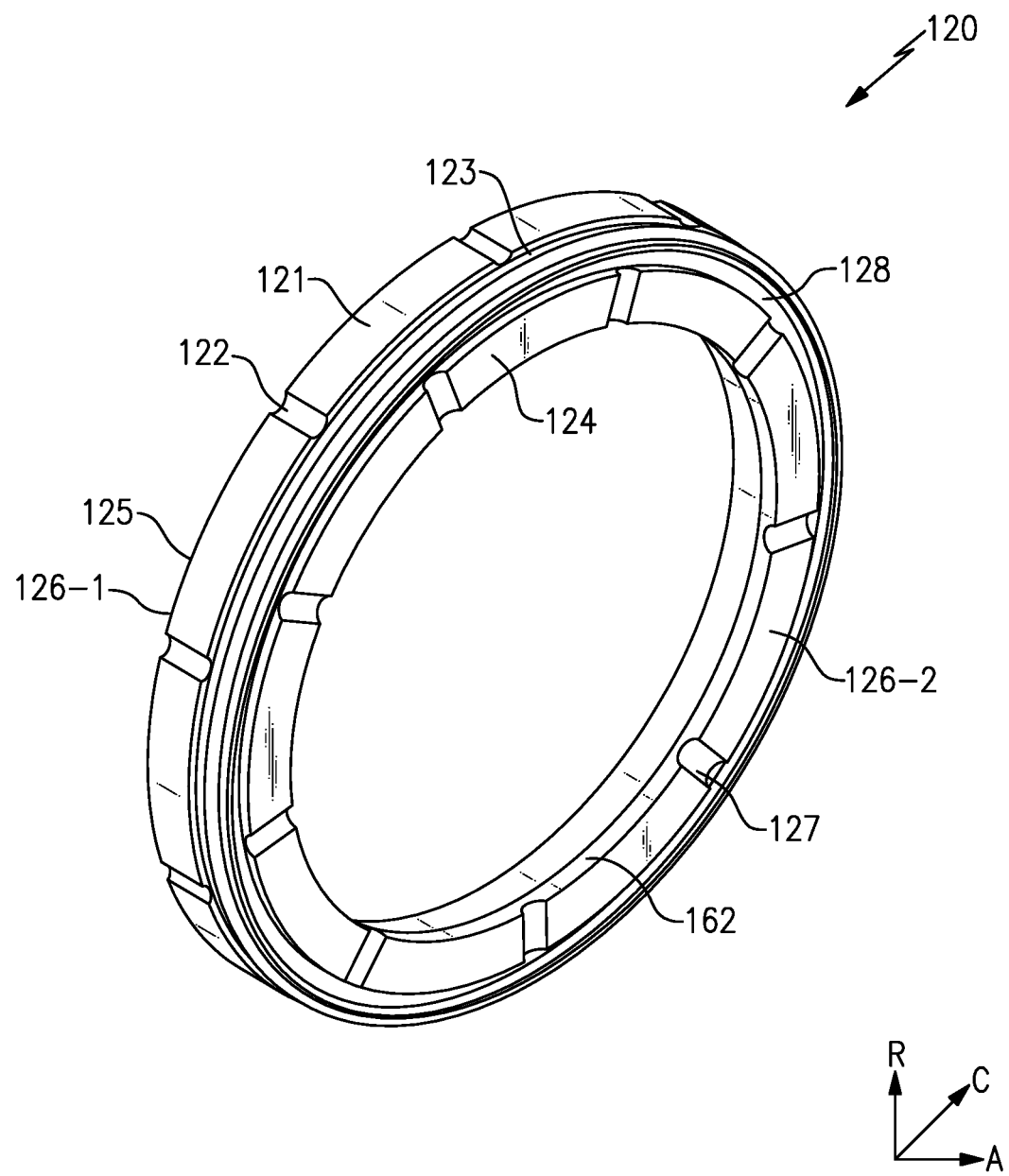
FIG. 4C illustrates an aft perspective view of the oil side ring seal for the ring seal arrangement, in accordance with various embodiments.

In various embodiments, and with reference to FIGS. 3, 4B, and 4C, oil side ring seal 120 may comprise a second radially outer surface 121 configured to contact static liner 71 to at least partially provide sealing against static liner 71. Oil side ring seal 120 may also comprise a second forward axially outer surface 126-1 opposite a second aft axially outer surface 126-2. Second forward axially outer surface 126-1 may be configured to interface with first aft axially outer surface 116-2 of air side ring seal 110, as discussed further herein. Second aft axially outer surface 126-2 may be configured to contact rear seat 75 and at least partially providing sealing against rear seat 75.

In various embodiments, oil side ring seal 120 may comprise various bleed grooves and/or slots configured to relieve and/or balance pressure between oil side ring seal 120 and air side ring seal 110 (e.g., by allowing high pressure fluid or air to leak into each bleed groove and/or slot). For example, oil side ring seal 120 may comprise one or more second radial surface grooves 122. In that regard, oil side ring seal 120 may comprise any suitable and/or desired number of second radial surface grooves 122. Each second radial surface groove 122 may define a groove along the A-axis on second radially outer surface 121. Second radial surface grooves 122 may be dispersed circumferentially around second radially outer surface 121 at any suitable distance. In various embodiments, oil side ring seal 120 may also comprise a radial surface circumferential slot 123. Radial surface circumferential slot 123 may define a continuous circumferential slot along the C-axis on second radially outer surface 121. Radial surface circumferential slot 123 may be located forward of second aft notch 124 and may be in fluid communication with second radial surface grooves 122 (e.g., fluid may flow through each second radial surface groove 122 and into radial surface circumferential slot 123).

As a further example, and in various embodiments, oil side ring seal 120 may also comprise one or more second aft axial surface grooves 127. In that regard, oil side ring seal 120 may comprise any suitable and/or desired number of second aft axial surface grooves 127. Each second aft axial surface grooves 127 may define a groove along the R-axis on second aft axially outer surface 126-2. Second aft axial surface grooves 127 may be dispersed circumferentially around second aft axially outer surface 126-2 at any suitable distance. In various embodiments, second aft axial surface grooves 127 may be aligned with second radial surface groove 122. In various embodiments, second aft axial surface grooves 127 may be misaligned (e.g., offset) with second radial surface groove 122. In various embodiments, oil side ring seal 120 may also comprise an axial surface circumferential slot 128. Axial surface circumferential slot 128 may define a continuous circumferential slot along the C-axis on second aft axially outer surface 126-2. Axial surface circumferential slot 128 may be located radially inward from second aft notch 124 and may be in fluid communication with second aft axial surface grooves 127 (e.g., fluid may flow through each second aft axial surface grooves 127 and into axial surface circumferential slot 128).

In various embodiments, oil side ring seal 120 may comprise a second aft notch 124. Second aft notch 124 may define a circumferential slot along second radially outer surface 121 and second aft axially outer surface 126-2 of oil side ring seal 120. Second aft notch 124 may be configured to allow for uniform wear on oil side ring seal 120 during engine operation.

In various embodiments, oil side ring seal 120 may comprise an extended leg 125. Extended leg 125 may protrude from second forward axially outer surface 126-1 of oil side ring seal 120 in an axial direction towards air side ring seal 110. Extended leg 125 may be configured to ensure proper seating of oil side ring seal 120 and air side ring seal 110 in ring seal arrangement 100. In various embodiments, extended leg 125 and first aft axially outer surface 116-2 of air side ring seal 110 may define a clearance cavity 150. Clearance cavity 150 may define a gap between extended leg 125 and first aft axially outer surface 116-2 of air side ring seal 110, and may be configured to provide clearance to allow air side ring seal 110 and oil side ring seal 120 to move independently, expand and/or contract during operation, and/or for ease of installation.

In various embodiments, and with reference again to FIG. 3, extended leg 125 and second forward axially outer surface 126-1 of oil side ring seal 120 and first aft axially outer surface 116-2 of air side ring seal 110 may define a spring cavity 130. Spring cavity 130 may define a gap between extended leg 125 and second forward axially outer surface 126-1 of oil side ring seal 120 and first aft axially outer surface 116-2 of air side ring seal 110, and may be configured to receive a spring 140, and/or any other suitable pressure balancing component. Spring 140 may be configured to provide an axial spring force against air side ring seal 110 and oil side ring seal 120 to ensure proper seating of air side ring seal 110 against front seat 72 and oil side ring seal 120 against rear seat 75. In that respect, spring 140 may comprise any suitable spring and/or similar component capable of providing spring force against air side ring seal 110 and oil side ring seal 120. For example, spring 140 may comprise one or more wave springs, coil springs, and/or the like. In various embodiments, one or more washers may also be inserted along the axial sides of spring 140 in spring cavity 130 to reduce component wear against air side ring seal 110 and oil side ring seal 120 caused by spring 140 rubbing against the axial surfaces.

Figure 5A:
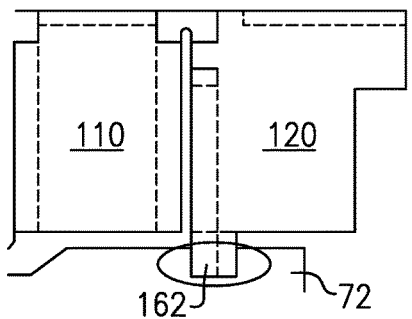
FIG. 5A is a first attempted installation configuration with the disclosed ring seal arrangement.
Figure 5B:
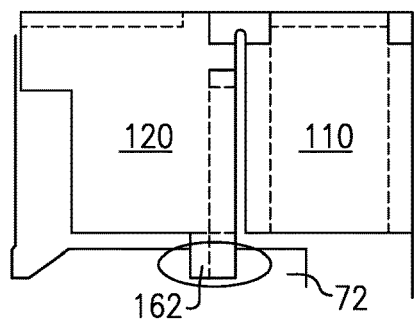
FIG. 5B is a second attempted installation configuration with the disclosed ring seal arrangement.
Figure 5C:
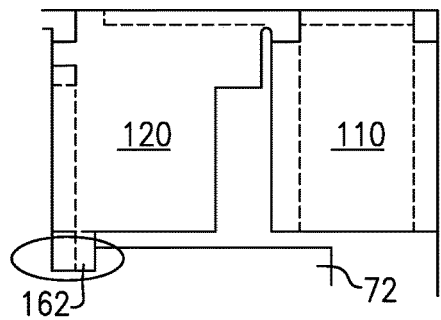
FIG. 5C is a third attempted installation configuration with the disclosed ring seal arrangement.

It is desirable to incorporate fool proofing features in the ring seal assembly to prevent assembly errors. With continuing reference to FIG. 3, the air side ring seal 110 is symmetrical with respect to a radially extending plane P, enabling the air side ring seal 110 to be reversed during assembly with no adverse consequences. The oil side ring seal 120 includes a first inner circumferential surface 164, which is near the spring 140. An interference feature 160, which is an annular flange 162, for example, extends radially inward from the first inner circumferential 164 surface to a second inner circumferential surface 166. The interference feature 160 prevents reversal of the oil side ring seal 120 or installation of the oil side ring seal 120 in place of the air side ring seal 110 (see, e.g., FIGS. 5A-5C). In particular, the flange 162 would interfere with the front seat 72 in any position other than the desired assembly position. The interference feature 160 may also be provided by circumferentially spaced tabs if desired.

The air side ring seal 110 has an inner diameter 176, and the first inner circumferential surface 164 is radially aligned with the inner diameter 176. The second forward and aft axially outer surfaces 126-1, 126-2 of the oil side ring seal 120 are spaced laterally from one another. The flange 162 is proximate to the second forward axially outer surface 126-1.

The flange 162 includes first and second faces 172, 174 laterally spaced from one another. The first lateral face 172 is adjacent to the first inner circumferential surface 164, and the second inner circumferential surface 166 interconnects the first and second lateral faces 172, 174. In the example shown in FIGS. 3-5C, the second lateral face 174 is flush with the second aft axially outer surface 126-2. In this example, the second aft axial surface grooves 127 extend across the second lateral face 174 to the second inner circumferential surface 166.

Figure 6:
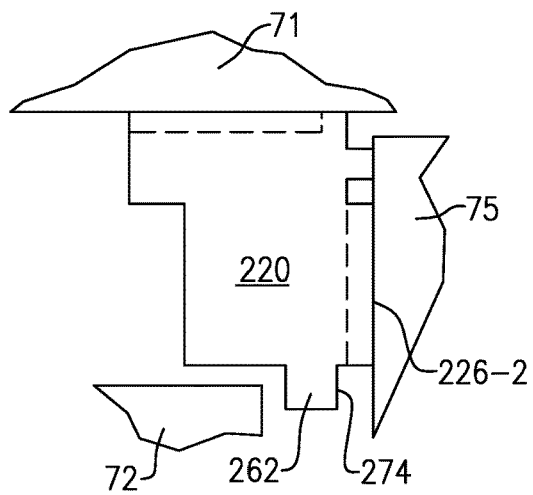
FIG. 6 is another oil side ring seal embodiment.

In another example shown in FIG. 6, the oil side ring seal 220 provides a flange 262 that has its second lateral face 274 axially recessed with respect to the second aft axialy outer surface 226-2.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A ring seal assembly comprising:
    a first ring seal that is symmetrical with respect to a radially extending plane;
    a second ring seal separated from the first ring seal by a spring, the second ring seal includes a first inner circumferential surface, and an interference feature extends radially inward from the first inner circumferential surface to a second inner circumferential surface, the second ring seal includes axially outer surfaces spaced laterally from one another, the interference feature is provided by an annular flange proximate to one of the axially outer surfaces.

2. The ring seal assembly according to claim 1, wherein the first ring seal has an inner diameter, the first inner circumferential surface radially aligned with the inner diameter.

3. The ring seal assembly according to claim 1, wherein the second ring seal includes axially outer surfaces spaced laterally from one another, and the interference feature is provided by a flange proximate to one of the axially outer surfaces.

4. The ring seal assembly according to claim 3, wherein the flange is annular.

5. The ring seal assembly according to claim 4, wherein the one of the axially outer surfaces includes an axial surface groove.

6. The ring seal assembly according to claim 5, wherein the flange includes first and second faces laterally spaced from one another, the first lateral face adjacent to the first inner circumferential surface, and the second inner circumferential surface interconnecting the first and second lateral faces.

7. The ring seal assembly according to claim 6, wherein the second lateral face is flush with the one of the axially outer surfaces.

8. The ring seal assembly according to claim 7, wherein an axial surface groove extends across the second lateral face to the second inner circumferential surface.

9. The ring seal assembly according to claim 6, wherein the second lateral face is axially recessed with respect to the one of the axially outer surfaces.

10. The ring seal assembly according to claim 1, wherein the second ring seal includes an extended leg protruding in an axial direction from the other of the axially outer surfaces towards the first ring seal, the extended leg and the other of the axially outer surfaces define a spring cavity on an inner radial side of extended leg that receives the spring, and the extended leg and the other of the axially outer surfaces define a clearance cavity on an outer radial side of the extended leg.

11. A gas turbine engine comprising:
an engine static structure;
a shaft supported for rotation by the engine static structure, one of the engine static structure and the shaft providing a circumferential sealing seat;
first and second compartments axially spaced apart from one another and provided between the engine static structure and the shaft;
a ring seal assembly separating the first and second compartments, the ring seal assembly including:
a first ring seal that is symmetrical
a second ring seal separated axially from the first ring seal by a spring, the second ring seal includes a first inner circumferential surface opposite a radially outer surface that engages the circumferential sealing seat, and an interference feature extends radially inward from the first inner circumferential surface to a second inner circumferential surface, the second ring seal includes axially outer surfaces spaced laterally from one another, the interference feature is provided by an annular flange proximate to one of the axially outer surfaces, wherein the second inner circumferential surface is spaced radially from the circumferential sealing seat.

12. The gas turbine engine according to claim 11, comprising first and second seats mounted to the shaft, the ring seal assembly axially arranged between the first and second seats, with the first and second ring seals respectively engaging the first and second seats.

13. The gas turbine engine according to claim 12, wherein the first compartment is an air compartment, and the second compartment is a bearing compartment, and the first ring seal is symmetrical with respect to a radially extending plane.

14. The gas turbine engine according to claim 11, wherein the first ring seal has an inner diameter, the first inner circumferential surface radially aligned with the inner diameter.

15. The gas turbine engine according to claim 14, wherein the one of the axially outer surfaces includes an axial surface groove.

16. The gas turbine engine according to claim 15, wherein the flange includes first and second faces laterally spaced from one another, the first lateral face adjacent to the first inner circumferential surface, and the second inner circumferential surface interconnecting the first and second lateral faces.

17. The gas turbine engine according to claim 16, wherein the second lateral face is flush with the one of the axially outer surfaces.

18. The gas turbine engine according to claim 17, wherein the axial surface groove extends across the second lateral face to the second inner circumferential surface.

19. The gas turbine engine according to claim 16, wherein the second lateral face is axially recessed with respect to the one of the axially outer surfaces.

20. The gas turbine engine according to claim 11, wherein the second ring seal includes an extended leg protruding in an axial direction from the other of the axially outer surfaces towards the first ring seal, the extended leg and the other of the axially outer surfaces define a spring cavity on an inner radial side of extended leg that receives the spring, and the extended leg and the other of the axially outer surfaces define a clearance cavity on an outer radial side of the extended leg.

* * * * *